(No Model.)

C. COOLIDGE.
CARRIAGE WHEEL.

No. 353,779. Patented Dec. 7, 1886.

UNITED STATES PATENT OFFICE.

CALVIN COOLIDGE, OF CLEVELAND, OHIO.

CARRIAGE-WHEEL.

SPECIFICATION forming part of Letters Patent No. 353,779, dated December 7, 1886.

Application filed April 2, 1883. Serial No. 90,269. (No model.)

*To all whom it may concern:*

Be it known that I, CALVIN COOLIDGE, of Cleveland, in the county of Cuyahoga and State of Ohio, have invented a certain new and Improved Carriage-Wheel; and I do hereby declare that the following is a full, clear, and complete description thereof.

This invention relates to carriage-wheels, the nature of which consists in securing the spokes to the hub by means of screws inserted between the tenons of the spokes and the hub.

This improvement is especially adapted to the securing of spokes to wheels wherein the spokes have become loose.

It is well known that the lateral strain to which carriage-wheels are subjected is the primary cause of weakness to the extent that spokes become loose in the hub, which renders the wheel useless or unsafe until the resetting of the wheel and tire, which is attended with more or less cost and delay. By the use of the said improvement these objections are greatly obviated.

That the invention may be more fully understood, reference will be had to the following specification, and to the annexed drawings, making part of the same, in which—

Figure 1:
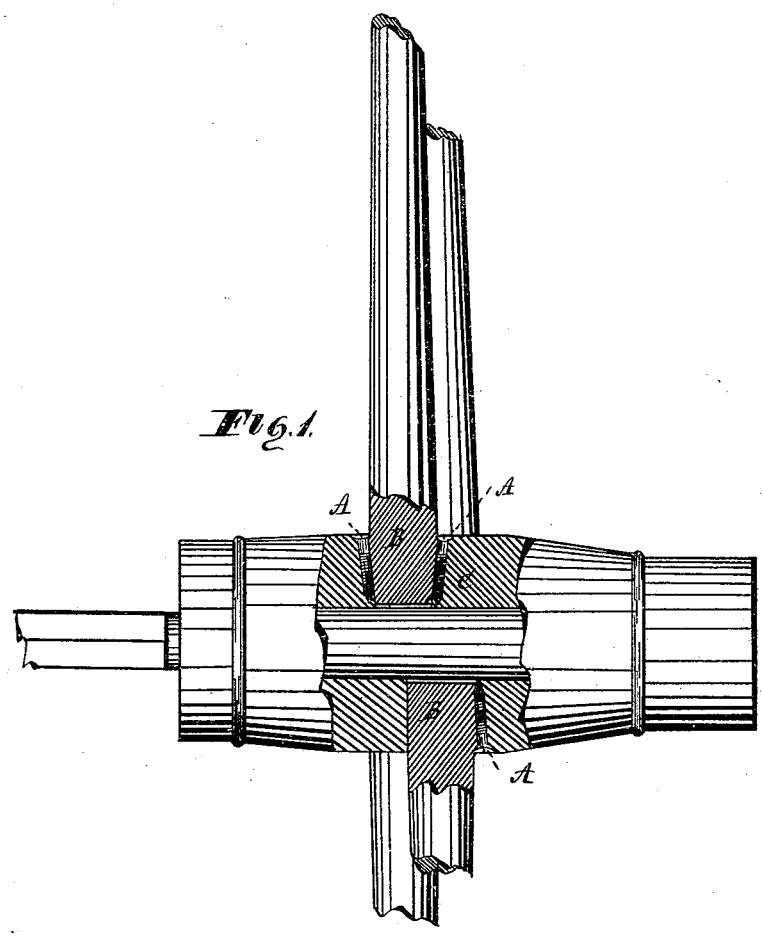
Figure 2:
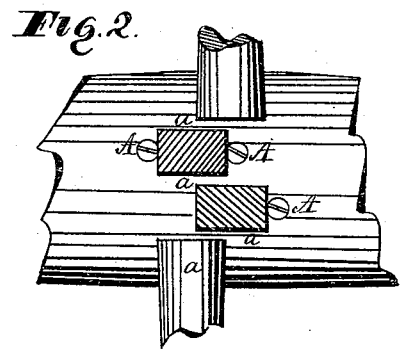

Figure 1 is a vertical sectional view of a hub and spokes, showing the improvement, a portion of the hub being removed for this purpose. Fig. 2 is a plan view of a part of a hub and spokes, showing the improvement.

Like letters of reference refer to like parts in the several views.

As stated, the spokes become loose in the hub by the lateral strain to which the wheel is subjected in use. The longitudinal strength of the wheel is not so materially injured by the side thrust, only so far as the wheel becomes weak by the lateral strain. When the spokes have become loose laterally in the mortises of the hub, I insert screws A on one or both sides of the tenon B, between the mortise and the tenon, as seen in Fig. 1, which screw is so entered that a part of it will be in the tenon and the other part in the wood of the hub at the end of the mortise, so that the thread of the screw will enter the wood of the tenon and the wood of the hub adjoining the tenon at the same time, as indicated in Fig. 1. This threading of the screw into the tenon and hub at C prevents all lateral vibration of the spokes in the hub, as the thread of the screws in the wood of the spoke and hub will prevent the tenon from moving in the mortise. The screws in the wood will hold the tenon from being pulled or drawn from close and tight contact with the mortise by the lateral strain usually exerted upon wheels when in use.

By means of the screws a loose spoke in the hub is rendered tight and secure by this mode of fastening the tenon to the hub, and it is done with comparatively small expense, and in a short time, without resorting to the cost and delay of resetting the spokes and tire of the wheel. This mode of securing the spokes may be applied to new wheels, as an additional security for holding the spokes in place. I propose in some cases to use a tapering screw, so that it may be forced into the wood from time to time, that the spokes may be tightened at any time, if needed; or a screw may be removed and a larger one inserted in place thereof for the same purpose.

On the sides $a$, Fig. 2, of the tenon screws are not deemed necessary, as there is comparatively but little wear or strain to loosen them at the sides. The sides are, however, more or less weakened by the lateral movement of the tenon in the mortise.

What I claim as my invention, and desire to secure by Letters Patent, is—

In a vehicle-wheel, the combination, with one or more spokes and the hub, of one or more screws, respectively, inserted between the tenon of the spoke and mortise of the hub, substantially as set forth.

In testimony whereof I affix my signature in presence of two witnesses.

CALVIN COOLIDGE.

Witnesses:
J. H. BURRIDGE,
W. H. BURRIDGE.